3,541,009
POLYMER-POLYSACCHARIDE-CAUSTIC ALKALI COMPOSITIONS AND PROCESS OF SEPARATING SOLIDS FROM AQUEOUS SUSPENSIONS THEREWITH
Philip S. Arendt, Chicago, and Elmer W. Palmer, Lisle, Ill., assignors to Nalco Chemical Company, Chicago, Ill., a corporation of Delaware
No Drawing. Filed Dec. 18, 1968, Ser. No. 784,880
Int. Cl. B01d 21/01
U.S. Cl. 210—52                      7 Claims

ABSTRACT OF THE DISCLOSURE

Compositions consisting essentially of a high molecular weight water soluble polymer of at least one olefinically unsaturated monomer, a high molecular weight polysaccharide and a caustic alkali are prepared which are especially useful in the coagulation, flocculation, sedimentation and/or filtration of aqueous suspensions of solids.

---

This invention relates to new compositions consisting essentially of at least three components, namely, (1) a high molecular weight water soluble polymer of at least one olefinically unsaturated monomer, (2) a high molecular weight polysaccharide, and (3) a caustic alkali, combined in such porportions as to produce a synergistic effect in the coagulation, flocculation, sedimentation and/or filtration of aqueous suspensions of solids.

It is known in the art that certain high molecular weight water soluble polymers of olefinically unsaturated monomers have coagulating properties and are useful in coagulation, flocculation, sedimentation and/or filtration of aqueous suspensions of solids. It is also known that polysaccharides, such as starches, can be used for similar purposes.

One of the objects of the present invention is to provide a new and improved method for coagulating, flocculating, settling, and/or filtering aqueous suspensions of solids which invloves a simultaneous dual treatment of such aqueous suspensions with a high molecular weight water soluble polymer and a high molecular weight polysaccharide wherein said polymer and said polysaccharide have a synergistic effect.

Another object of the invention is to provide new and useful compositions which can be used for a single high activity treatment in the coagulation, flocculation, settling and/or filtration of aqueous suspensions of solids.

A more specific object of the invention is to provide a new and improved method and composition for settling red mud from Bayer process liquor.

Another specific object of the invention is to provide a new and improved method and compositions for settling suspensions of solids from blast furnaces or basic oxygen furnaces, or sinter blast dust or vacuum filter overflows in steel plants. Other objetcs will appear hereinafter.

The invention has two aspects. The first involves a method for coagulating, flocculating, settling and/or filtering aqueous suspensions of solids by the simultaneous dual treatment of such aqueous suspensions with a high molecular weight water soluble polymer of at least one olefinically unsaturated monomer and a high molecular weight polysaccharide in the presence of caustic alkali and in such proportions that a synergistic effect is obtained. This aspect of the invention is especially useful in settling red mud from Bayer process liquor and in settling suspensions of solids from blast furnaces, or basic oxygen furnaces, or sinter blast dust, or vacuum filter overflows in steel plants. It will be understood, however, that the same general method is applicable to coagulating, flocculating, settling and/or filtering other aqueous suspensions of inoragnic and/or organic solids, including clays, calcium carbonate, coal wash waters, residues from ore mining processes, sewage waste waters, paper mill waste waters, and waste waters from other industrial processes. In view of its general utility, the invention is especially advantageous in the control and prevention of pollution.

A second aspect of the invention is the provision of a single high activity composition which consists essentially of a high molecular weight water soluble polymer of at least one olefinically unsaturated monomer, a high molecular weight polysaccharide and a caustic alkali combined in such poroportions as to produce a synergistic effect in the coagulation, flocculation, sedimentation and/or filtration of aqueous suspensions of solids.

The high molecular weight water soluble polymers which are employed in the practice of the invention can be derived by polymerizing olefinically unsaturated monomers. The monomer used in the polymerization can be one which gives a polymer containing hydrophilic groups so that the polymer is water soluble under the conditions of use. Two or more monomers can be used to produce copolymers containing sufficient hydrophilic groups to be water soluble under the conditions of use. Alternatively, the polymer can be partially hydrolyzed or otherwise modified to give it the desired hydrophilic properties. In general, the polymers employed for the purpose of the invention are linear polymers containing water solubilizing groups as side chains. The preferred water solublizing groups are carboxy, carboxylate and amide groups, and it is desirable that at least some of the water solubilizing groups be anionic. Since caustic alkali is one of the active ingredients of the compositions used for the purpose of the invention, it is evident that any free carboxylic groups normally present in the polymer will be neutralllized and will exist as carboxylate groups. Sodium polyacrylate and copolymers of acrylic acid and acrylamide are especially useful for the practice of the invention. Polyacrylamide can also be employed. In many cases, polyacrylamide, as presently manufactured, contains some carboxy groups and, in any event, its use under controlled conditions in the presence of caustic alkali could result in the formation by hydrolysis of polymers containing carboxy groups.

Copolymers of sodium acrylate and acrylamide comprising a fraction of 1% up to 95% by weight sodium acrylate, preferably 5% to 95%, and 95% to a fraction of 1% by weight acrylamide, preferably 95% to 5%, are especially useful for the purpose of the invention. Specific examples of such copolymers contain 5% sodium acrylate and 95% acrylamide, or 30% sodium acrylate and 70% acrylamide, or approximately 50% sodium acrylate and 50% acrylamide. Other polymers or copolymers of acrylic acid types which can be used are those obtained by polymerization of acrylic acid, methacrylic acid, sulfoethylacrylate, carboxyethylacrylate, or salts thereof, or copolymers thereof of the acids or salts obtained by suitable copolymerization with monomers, such as acrylamide, methacrylamide, acrylonitrile, methacrylonitrile, lower alkyl esters of acrylic acid, vinyl alkyl ethers, and the like. For the purpose of this invention the high molecular weight polymers should have a weight average molecular weight in excess of 100,000 and usually at least 2,000,000.

The high molecular weight polysaccharide is preferably a causticized pregelatinized potato starch but many different types of starches and modified starches can be employed, including not only potato starch but also corn, wheat, oat, barley, rye, sago, milo, waxy maize, tapioca, and modifications of such starches obtained by heating, acid treatment, oxidation, or enzymatic action. Thus, British gums obtained by heating the various types of starches can be used. Similarly, dextrines obtained by acid treatment of the various starches can be employed. Chlorinated corn starch and other types of oxidized starches can be used. Starches which have been partially degraded by treatment with amylase can be used. While ungelatinized starches can be employed, especially good results have been obtained with starches that have been at least partially pregelatinized. Other polysaccharides, for example, sorghum, can also be used. Where a starchy polysaccharide is employed, it is preferable that it be of the amylopectin type. Less desirable results are obtained with amylose alone. In general, the minimum weight average molecular weight of the polysaccharide should be at least 50,000 and preferably at least 500,000.

The caustic alkali employed for the purpose of the invention is usually caustic soda or sodium hydroxide. Other caustic alkalis are potassium hydroxide and lithium hydroxide but these are more expensive. The caustic alkali can also contain other alkalis, such as sodium carbonate.

The relative proportions of high molecular weight polymer and polysaccharide should be within a weight ratio of 1:75 to 1:1. When the proportions are outside of the ranges covered by these ratios, the special benefits of the synergistic effect are no longer normally obtained. The quantity of caustic alkali employed in the practice of the invention, exclusive of any caustic alkali used in preparing the polymer, should be within the range of a minimum of 8% by weight and a maximum of 42% by weight, based on the total weight of polymer, polysaccharide and caustic alkali. Especially useful ratios of polymer to polysaccharide are 1:50, 1:25 and 1:6. The preferred percentage of caustic alkali, exclusive of caustic alkali used in preparing the polymer, is around 10%.

The quantity of solids present in a suspension which is treated in accordance with the invention to produce coagulation, flocculation and/or settling or to facilitate filtering is subject to variation but is usually within the range of 100 parts per million (p.p.m.) to 50,000 p.p.m. (0.01% to 5% by weight). For the purpose of the invention the suspension is usually treated at a pH within the range of 5 to 11. Examples of specific pH's that can be used are 5, 6.5, 9 and 11.

In practicing the invention the total quantity of high molecular weight polymer, high molecular weight polysaccharide and caustic alkali added to a suspension of solids in water for coagulation, flocculation, settling and/or filtration is very small, normally being within the range of 0.05 p.p.m. to 15 p.p.m. and preferably 1 to 3 p.p.m.

The invention will be further illustrated but is not limited by the following examples in which the quantities are given in parts by weight, unless otherwise indicated.

EXAMPLE I

A composition was prepared which was a physical blend of 1 part of a copolymer containing 30% sodium acrylate and 70% acrylamide and having a weight average molecular weight in excess of 5,000,000 and 75 parts of pregelatinized potato starch, together with 10% by weight of sodium hydroxide, based on the total weight of said copolymer and starch.

This product can be prepared in several ways, namely, by blending and grinding together 1.18 parts of said copolymer, 25.82 parts of said starch and 10 parts of sodium hydroxide to produce a fraction A, and thereafter mixing the fraction with a fraction B consisting of 63 parts of said starch. This procedure has the advantage that by grinding and blending fraction A, the moisture normally present in the starch will attract the sodium hydroxide and in so doing, may entrap and hold the polymer from any segregation. An alternative method is to blend the polymer and the sodium hydroxide and thereafter mix this blend with the starch.

A third alternative is to blend all of the components together simultaneously and then grind the product in a hammermill.

EXAMPLE II

The procedure was the same as in Example I except that water was added to the causticized starch and the polymer, as a dry powder, was mechanically dispersed in the resultant solution at a temperature below 110° F. and allowed to solubilize.

EXAMPLE III

The procedure was the same as in Example I except that the polymer was sodium polyacrylate having a weight average molecular weight of about 5,000,000.

EXAMPLE IV

The procedure was the same as in Example I except that the polymer was a copolymer of 51% acrylamide and 49% sodium acrylate.

EXAMPLE V

The procedure was the same as in Example I except that the polymer was a copolymer of 95% acrylamide and 5% sodium acrylate.

EXAMPLE VI 75 parts of sorghum was added to a solution of 2320 parts of water containing 87 parts NaOH and the resultant mixture was heated at 190° F. for 20 minutes. The resultant solution was then cooled to 78° F. and 18.75 parts of sodium polyacrylate was dispersed into the solution as a powder and allowed to solubilize. The viscosity at 78° F. at this stage was 98 centipoises. In 24 hours the viscosity was 1360 centipoises.

EXAMPLE VII

A product was prepared by adding 15 parts of sorghum to a solution of 468 parts of water and 17.4 parts NaOH. This was heated to 200° F. for 10 minutes and then cooled to 80° F. 2.75 parts of a copolymer of 49% sodium acrylate and 51% acrylamide was dispersed into the solution and allowed to solubilize. At this stage the solution had a viscosity of 80 centipoises at 80° F. In 90 minutes the viscosity was 540 centipoises.

EXAMPLE VIII

A composition was prepared as in Example I except that the amount of sodium hydroxide used was 42% by weight, based on the total weight of the copolymer and starch.

In Example I, the pregelatinized starch used was a commercially available starch known as Hamaco No. 10. This is a causticized potato starch which contains large gel particles. Other types of starches, gums, dextrines and amylopectin fractions can be substituted with similar results.

EXAMPLE IX

This example illustrates the synergistic effect in the settling of suspensions of iron oxide and calcium oxide from a steel mill slurry obtained as a waste product from a blast furnace. The slurry contained about 1% by weight (10,000 p.p.m.) of suspended solids.

To evaluate the effectiveness of the invention, four 250 ml. samples of said slurry were placed in four 450 ml. beakers, each equipped to be stirred by a rectangular one inch by one and one-half inch paddle operated by the same motor. Each slurry was stirred at 180± 20 r.p.m. during the addition of a settling additive, and thereafter at 75 r.p.m. for three minutes at ambient temperature (about 75° F.). Each slurry was then allowed to settle for five minutes and at the end of that time a sample was removed from each slurry by means of a pipette and the residual turbidity was determined by a photometer.

The starch of Example I was added to each slurry in various proportions from 0.25 to 5 p.p.m. without substantial effect. The polymer in the composition of Example I was separately added to each slurry without the starch in a dosage of 0.25 p.p.m. and gave the optimum residual turbidity which was 47 p.p.m. of suspended solids. Increasing the dosage to 0.5 p.p.m. did not reduce this turbidity. A blend of the starch of Example I and the polymer of Example I was then added. 0.25 p.p.m. of this blend contained 0.01 p.p.m. of the polymer of Example I and 0.24 p.p.m. of the starch of Example I. The optimum effect was obtained at a dosage of 0.5 p.p.m. where the turbidity was 38 p.p.m. Thus, the blend produced a better result than either the starch alone or the polymer alone and with the use of 1/25 of the amount of polymer required to produce an optimum effect by the polymer alone.

EXAMPLE X

The procedure was the same as in Example IX except that the polymer used was the same as that described in Example V. The optimum settling effect which was obtained with 0.5 p.p.m. of the polymer gave a residual turbidity of 45 p.p.m. The optimum settling effect obtained at a dosage of 0.5 p.p.m. with a blend of the same polymer and starch which contained 0.25 p.p.m. of each gave a residual turbidity of 43 p.p.m. Thus, a better settling effect was obtained with half the amount of polymer.

EXAMPLE XI

A blast furnace slurry containing 10,000 p.p.m. of suspended solids was tested as described in Example IX and a blank showed a residual turbidity of 150 p.p.m. The addition of 0.5 p.p.m. of causticized potato starch to the original slurry reduced the suspended solids to 94 p.p.m. The addition of one p.p.m. of said starch reduced the suspended solids to 78 p.p.m. The addition of 0.1 p.p.m. of the copolymer of Example I reduced the suspended solids to 110 p.p.m. The addition of a physical blend prepared as described in Example I at a dosage of 0.5 p.p.m. reduced the suspended solids to 70 p.p.m. Since the ratio of copolymer to starch in this blend is 1:75, it is apparent that the blend produced a result which was not obtained with either of the components of the blend alone.

In evaluating the invention, it was found that a dual treatment of causticized starch and sodium polyacrylate applied simultaneously from separate solutions gave better settling rates in the settling of red mud from Bayer process liquor than either the starch alone or the sodium polyacrylate alone. In this test, 40 parts of corn starch were prepared in a caustic solution of 19 parts NaOH per 1000 parts of solution and 1 part of sodium polyacrylate having a weight average molecular weight of 5,000,000 was employed as the polymer. Further testing showed that the ratio of polymer to starch will vary depending upon the settling characteristics desired. For example, more polymer to starch gives better compaction. A very dilute addition of either component to the other appears to reverse the synergism and poorer performance is obtained.

The practice of the invention in the treatment of slurries of suspended solids also produces a more mechanically stable floc than with a synthetic polymer treatment alone. The compositions of the invention provide a single high activity treatment which is very economical. While the polymer-polysaccharide-caustic alkali compositions are especially useful in settling red mud and steel slurries, they can also be employed for other purposes, for example, as a depressant in various flotation processes for copper, graphite, and talc. In addition, they can be used as sizing agents in the textile and paper industries.

The invention is hereby claimed as follows:

1. A process of separating solids from aqueous suspensions of finely divided solids which comprises simultaneously adding to such suspensions a coagulating amount of a high molecular weight water soluble polymer and a high molecular weight polysaccharide, together with caustic alkali, said polymer being derived from at least one olefinically unsaturated monomer and having a weight average molecular weight in excess of 100,000, said polysaccharide having a weight average molecular weight of at least 50,000, the relative weight proportions of said polymer and said polysaccharide being within the range of 1:75 to 1:1 and the quantity of caustic alkali, exclusive of any caustic alkali used in preparing the polymer, being within the range of a minimum of 8% by weight and a maximum of 42% by weight, based on the total weight of said polymer, said polysaccharide and caustic alkali.

2. A process as claimed in claim 1 in which said polymer is sodium polyacrylate having a weight average molecular weight of at least 2,000,000.

3. A process as claimed in claim 1 in which said polymer is a copolymer of sodium acrylate and acrylamide comprising 5% to 95% by weight sodium acrylate and 95% to 5% by weight acrylamide and having a weight average molecular weight of at least 2,000,000.

4. A process as claimed in claim 1 in which said suspension comprises iron oxide in suspension.

5. A composition consisting essentially of a high molecular weight water soluble polymer, a high molecular weight polysaccharide and a caustic alkali, said polymer being derived from at least one olefinically unsaturated monomer and having a weight average molecular weight in excess of 100,000, said polysaccharide having a weight average molecular weight of at least 50,000, the relative weight proportions of said polymer and said polysaccharide being within the range of 1:75 to 1:1 and the quantity of caustic alkali, exclusive of any caustic alkali used in preparing the polymer, being within the range of a minimum of 8% by weight and a maximum of 42% by weight, based on the total weight of said polymer, said polysaccharide and caustic alkali.

6. A composition as claimed in claim 5 in which said polymer is an acrylic polymer and said polysaccharide is a starchy polysaccharide.

7. A composition as claimed in claim 5 in which said polymer is a copolymer of sodium acrylate and acrylamide comprising 5% to 95% by weight sodium acrylate and 95% to 5% by weight acrylamide and having a weight average molecular weight of at least 2,000,000.

References Cited

UNITED STATES PATENTS

| 2,803,568 | 8/1957 | Bus et al. | 127—71 |
| 3,079,331 | 2/1963 | Gieseke | 210—53 |
| 3,397,953 | 8/1968 | Galvin et al. | 210—53 X |

FOREIGN PATENTS

| 481,499 | 3/1938 | Great Britain. |

MICHAEL E. ROGERS, Primary Examiner

U.S. Cl. X.R.

23—143; 106—212; 252—180